(12) United States Patent
Izutani et al.

(10) Patent No.: US 12,174,103 B2
(45) Date of Patent: Dec. 24, 2024

(54) LIGHT SCATTERING MEASURING APPARATUS AND MEASURING JIG

(71) Applicant: Otsuka Electronics Co., Ltd., Osaka (JP)

(72) Inventors: Yusuke Izutani, Hirakata (JP); Ikuo Wakayama, Hirakata (JP); Hiroya Nagasawa, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 132 days.

(21) Appl. No.: 17/524,744

(22) Filed: Nov. 12, 2021

(65) Prior Publication Data
US 2022/0155203 A1    May 19, 2022

(30) Foreign Application Priority Data
Nov. 17, 2020    (JP) .................................. 2020-190825

(51) Int. Cl.
*G01N 15/0205*    (2024.01)

(52) U.S. Cl.
CPC ................................ *G01N 15/0211* (2013.01)

(58) Field of Classification Search
CPC .... G01N 15/0211; G01N 21/49; G01N 15/14; G01N 15/0205; G01N 15/00; G01N 2201/066; G01N 2021/4726; G01N 2021/4709; G01N 2021/4707; G01N 2021/0367; G01N 2015/0053
See application file for complete search history.

(56) References Cited

U.S. PATENT DOCUMENTS

| | | | |
|---|---|---|---|
| 4,999,513 | A |  3/1991 | Ito et al. |
| 2018/0164278 | A1* | 6/2018 | Meckel .................. C12M 41/48 |
| 2019/0017915 | A1 | 1/2019 | Obata et al. |
| 2019/0234852 | A1 | 8/2019 | Scullion et al. |

FOREIGN PATENT DOCUMENTS

| | | | | |
|---|---|---|---|---|
| GB | 2340937 | A * | 3/2000 | ......... G01N 15/0211 |
| JP | H0274845 | A |  3/1990 | |
| JP | 6373486 | B2 | 8/2018 | |
| JP | 2019536997 | A | 12/2019 | |

OTHER PUBLICATIONS

Search Report of Apr. 8, 2022, for corresponding EP Patent Application No. 21208377.8 pp. 1-6.

* cited by examiner

*Primary Examiner* — Uzma Alam
*Assistant Examiner* — Huy Phillip Pham
(74) *Attorney, Agent, or Firm* — HEA Law PLLC

(57) ABSTRACT

Provided are a light scattering measuring apparatus. The light scattering measuring apparatus includes: light sources; a single light receiver; a sample holder including a cell, a frame body, a first opening formed in an incident portion of a first optical path used for forward measurement or side measurement, and a second opening formed in an incident portion of a second optical path used for back measurement, and an optical element; and a moving mechanism. The first optical path and the second optical path are separated from each other in vertical direction. The moving mechanism moves the first opening to a position of the incident portion of the first optical path when the forward or side measurement is to be performed, and to move the second opening to a position of the incident portion of the second optical path when the back measurement is to be performed.

14 Claims, 8 Drawing Sheets

⟶ FORWARD MEASUREMENT OPTICAL PATH
⤏ SIDE MEASUREMENT OPTICAL PATH
⇢ BACK MEASUREMENT OPTICAL PATH

LIGHT SCATTERING MEASURING APPARATUS AND MEASURING JIG

CROSS-REFERENCE TO RELATED APPLICATION

The present disclosure contains subject matter related to that disclosed in Japanese Priority Patent Application JP 2020-190825 filed in the Japan Patent Office on Nov. 17, 2020, the entire contents of which are hereby incorporated by reference.

BACKGROUND OF THE INVENTION

1. Field of the Invention

The present invention relates to a light scattering measuring apparatus and a measuring jig.

2. Description of the Related Art

As apparatus for measuring particle characteristics, such as shapes of particles, a particle size distribution, and a molecular weight, there are known light scattering measuring apparatus for detecting light scattered from a sample including the particles. When a particle size distribution of a sample in which particles of different particle sizes are mixed is analyzed, it is required to perform not only forward measurement or side measurement, in which a scattering angle formed by incident light and scattered light is small, but also back measurement, in which a scattering angle is large.

For example, in Japanese Patent Translation Publication No. 2019-536997, there is disclosed a light scattering measuring apparatus in which an optical element is arranged between a light source and a sample. The optical element modifies light from the light source to create a modified beam, and the modified beam diverges in the far field. As a result, a dark region that is substantially not illuminated is produced at a distance from the sample position along the illumination axis. Then, the light scattering measuring apparatus characterizes particle by a light receiver at a distance from the sample position detecting forward scattered light or back scattered light.

Further, in Japanese Patent No. 6373486, there is disclosed a light scattering measuring apparatus, which is an apparatus for detecting scattered light from a gel particle, and includes means for separating reflected light from a mechanism for stirring a sample and a reagent in a sample cell and a surface of the cell, and the scattered light from the sample. Still further, in Japanese Patent Application Laid-open No. Hei 02-074845, there is disclosed a particle measuring apparatus, in which incident light beams of different wavelengths are irradiated from two or more different directions, and the incident light beams can be deflected with a light deflector.

SUMMARY OF THE INVENTION

In recent years, it is required to downsize and reduce cost of apparatus. As a method for downsizing and reducing cost, there is a method of sharing a light receiver used for forward measurement or side measurement and back measurement. However, when the back measurement is performed with use of a light scattering apparatus that can perform the forward measurement or the side measurement, a reduction in measurement accuracy caused by a component (so-called stray light) other than scattered light occurs. Accordingly, when the back measurement is performed, it is required to take countermeasures so that the stray light (mainly the component resulting from incident light being reflected on a surface of a cell) does not enter the light receiver.

As the countermeasures, there is a method involving inclining the cell when the back measurement is performed. With this method, it is possible to prevent the light reflected on the surface of the cell from entering the light receiver. However, when the cell is inclined, a deviation occurs in an optical path in performing the forward measurement or the side measurement, and hence the apparatus that inclines the cell to perform the back measurement cannot perform the forward measurement or the side measurement.

The present disclosure has been made in view of the above-mentioned situation, and therefore has an object to provide a light scattering measuring apparatus, with which at least one of forward measurement or side measurement, and the back measurement can be performed, and which is downsized and reduced in cost with a single light receiver, and a measuring jig to be used in the light scattering measuring apparatus.

In order to solve the above-mentioned problem, according to at least one aspect of the present disclosure, there is provided a light scattering measuring apparatus, including: light sources configured to generate incident light to irradiate a sample; a single light receiver, which is arranged at a position at which scattered light output from the sample is received, and is configured to measure an intensity of the scattered light; a sample holder including a cell having a cavity in which the sample is to be contained, a frame body having a holding space in which the cell is to be arranged, a first opening formed in an incident portion of a first optical path used for at least one measurement of forward measurement or side measurement, in which a scattering angle formed by the incident light and the scattered light is 100° or less, and a second opening formed in an incident portion of a second optical path used for back measurement, in which a scattering angle exceeds 100°, and an optical element having a first surface that forms a certain angle with a side surface of the cavity; and a moving mechanism configured to move the sample holder in a vertical direction, the optical element being arranged in at least one of the incident portion or an exit portion of at least one optical path of the first optical path or the second optical path, the first optical path and the second optical path being separated from each other in the vertical direction, the moving mechanism being configured to move the first opening to a position of the incident portion of the first optical path when the at least one measurement of forward measurement or side measurement is to be performed, and to move the second opening to a position of the incident portion of the second optical path when the back measurement is to be performed.

Further, according to another aspect of the present disclosure, there is provided a measuring jig including a frame body having a holding space in which a cell is to be arranged, the cell having a cavity in which a sample is to be contained, a first opening formed in an incident portion of a first optical path used for at least one measurement of forward measurement or side measurement, in which a scattering angle formed by incident light to irradiate the sample and scattered light is 100° or less, and a second opening formed in an incident portion of a second optical path used for back measurement, in which a scattering angle exceeds 100°, the first optical path and the second optical path being separated from each other in a vertical direction.

DETAILED DESCRIPTION OF THE INVENTION

At least one embodiment of the present disclosure is described below with reference to the drawings.

Figure 1:
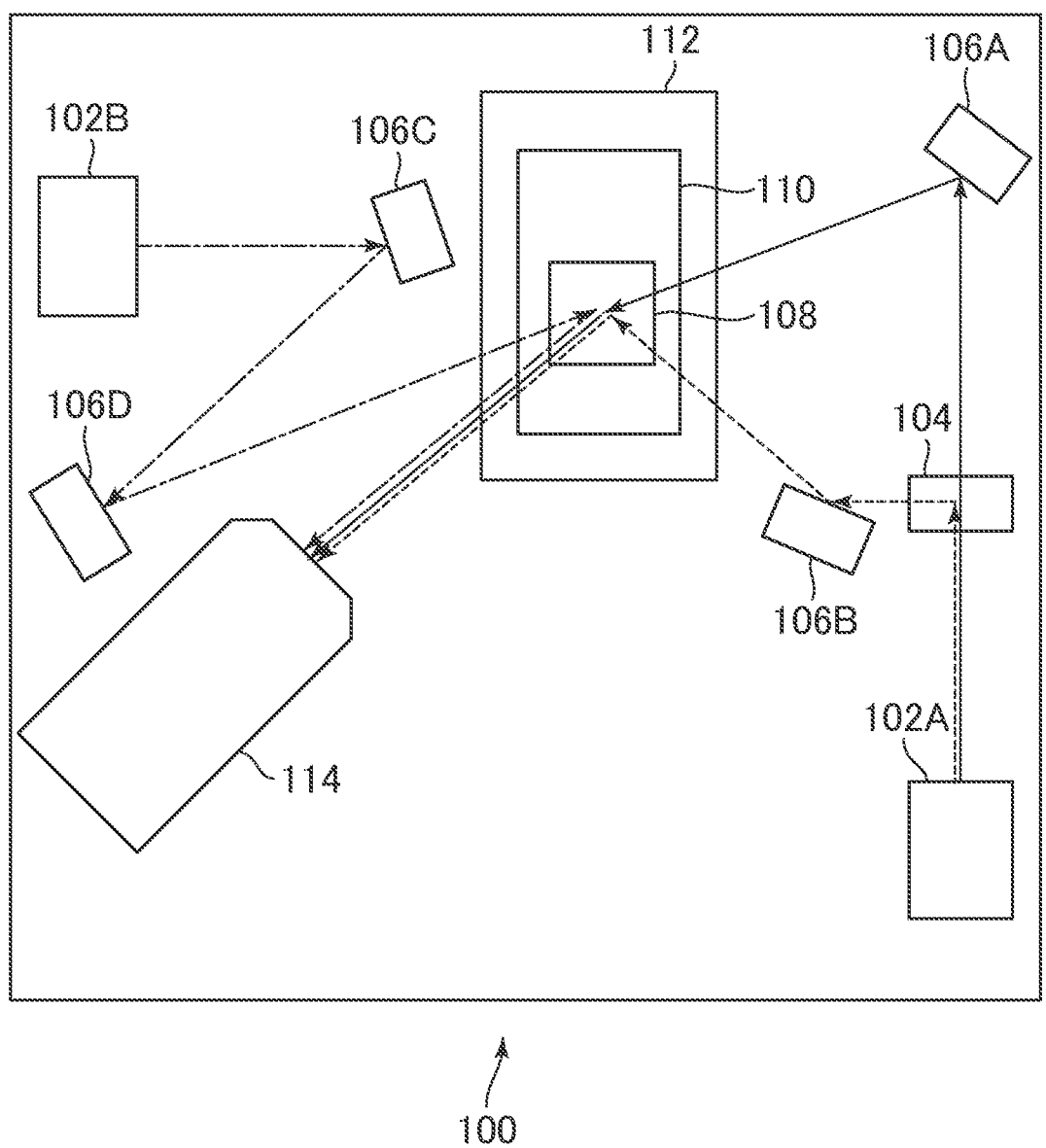
FIG. 1 is a view for schematically illustrating a light scattering measuring apparatus according to at least one embodiment of the present disclosure.

FIG. 1 is a view for schematically illustrating a light scattering measuring apparatus 100 according to the at least one embodiment of the present disclosure. As illustrated in FIG. 1, the light scattering measuring apparatus 100 includes light sources 102, a half mirror 104, mirrors 106, a cell 108, a sample holder, a moving mechanism 112, and a light receiver 114.

The light sources 102 generate light to irradiate a sample. Specifically, for example, the light sources 102 generate laser beams with use of, for example, a He—Ne laser or a semiconductor laser. Further, in the example illustrated in FIG. 1, the light sources 102 include a first light source 102A and a second light source 102B.

The first light source 102A generates light on a first optical path. In this example, the first optical path is an optical path used for the at least one measurement of forward measurement or side measurement. A path of light used in performing the forward measurement is hereinafter referred to as "forward measurement optical path." Further, a path of light used in performing the side measurement is referred to as "side measurement optical path." Still further, the light to irradiate the sample is referred to as "incident light," and light scattered by the sample is referred to as "scattered light."

The first optical path includes the forward measurement optical path and the side measurement optical path. The forward measurement and the side measurement are measurement performed under a condition in which a scattering angle formed by the incident light and the scattered light is 100° or less. For example, the scattering angle of the forward measurement exceeds 0° and is 80° or less, and the scattering angle of the side measurement exceeds 80° and is 100° or less.

The second light source 102B generates light on a second optical path. In this example, the second optical path is an optical path used for the back measurement. A path of light used in performing the back measurement is hereinafter referred to as "back measurement optical path." Further, the back measurement is measurement performed under a condition in which a scattering angle exceeds 100°. For example, the scattering angle of the back measurement exceeds 100° and is less than 180°. The forward measurement optical path, the side measurement optical path, and the back measurement optical path are described later in detail. Still further, it is assumed that positions in a Z-axis direction of the first light source 102A and the second light source 102B are the same.

In the example illustrated in FIG. 1, a light source is shared as a light source used for the forward measurement and a light source used for the side measurement, but the light source used for the forward measurement and the light source used for the side measurement may be provided individually.

The half mirror 104 separates the light emitted by the first light source 102A into light used on the forward measurement optical path and light used on the side measurement optical path. When the light source used for the forward measurement and the light source used for the side measurement are provided individually, the half mirror 104 may be omitted.

The mirrors 106 reflect light. Specifically, the mirrors 106 are arranged on the forward measurement optical path, the side measurement optical path, and the back measurement optical path, and reflect light on the optical paths. The mirrors 106 are arranged so that light on the optical paths, which is emitted by the light sources, is guided to the cell 108. Further, optical path lengths of the optical paths are adjusted by positions at which the mirrors 106 are arranged.

The cell 108 has a cavity in which the sample is to be contained. Specifically, for example, the cell 108 has a cuboid shape, and has the cavity formed of inner side surfaces that are parallel to outer surfaces. In the cavity, a liquid sample serving as an object to be measured is to be contained. The cell 108 having the sample contained therein is arranged in the sample holder.

Figure 2A:
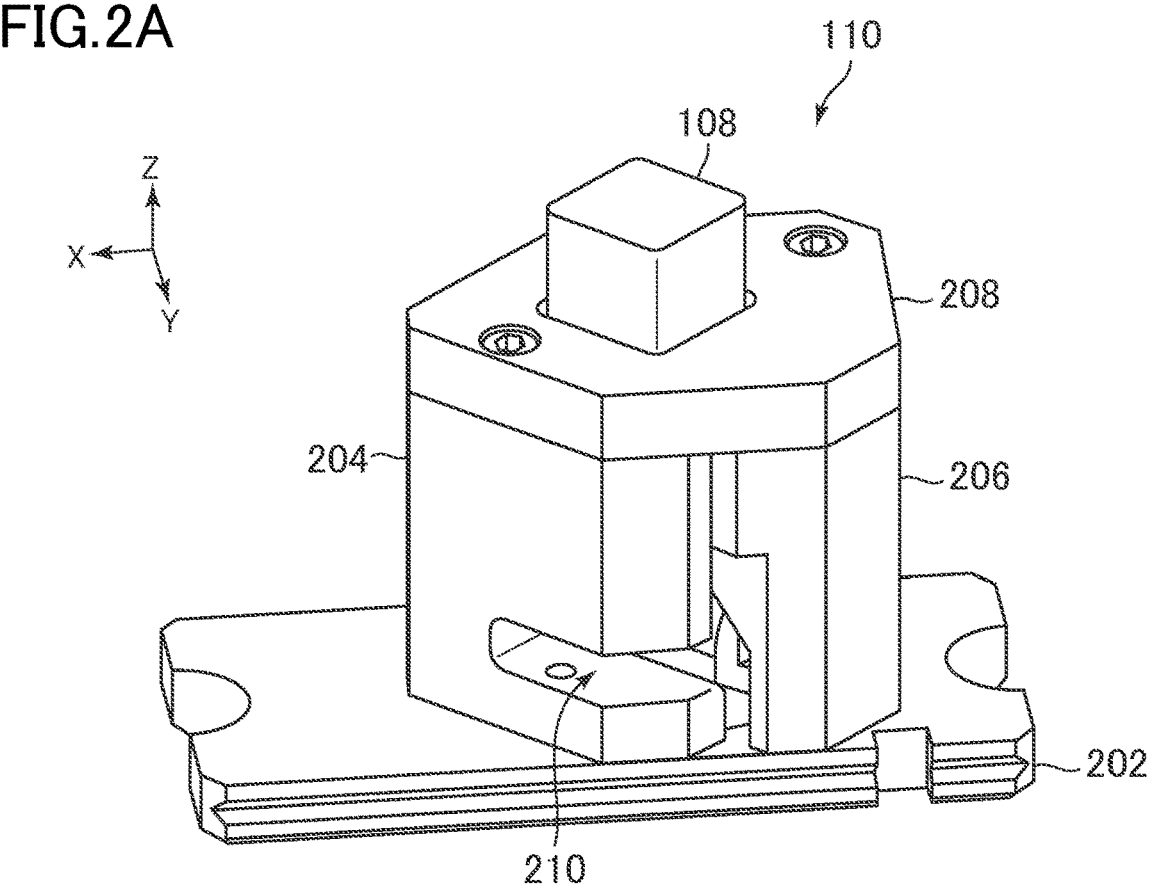
FIG. 2A is a perspective view of a measuring jig according to the at least one embodiment of the present disclosure.
Figure 2B:
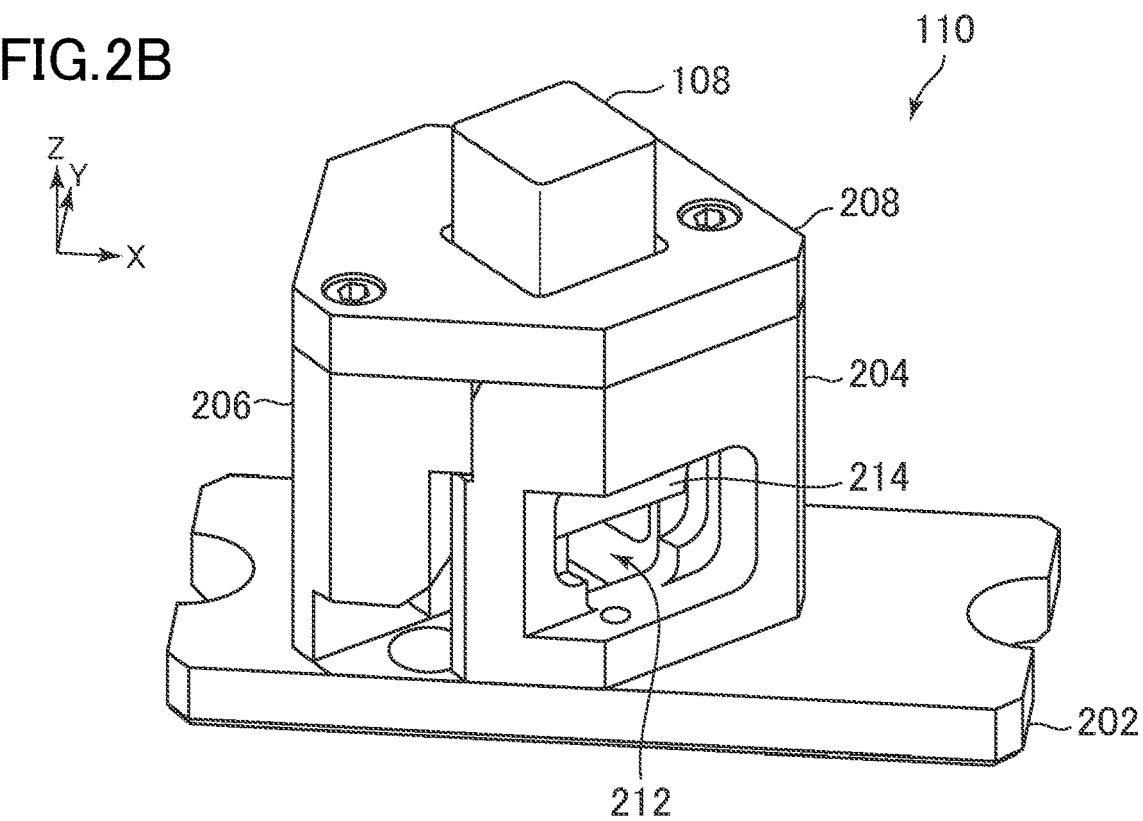
FIG. 2B is a perspective view of the measuring jig according to the at least one embodiment of the present disclosure.
Figure 3A:
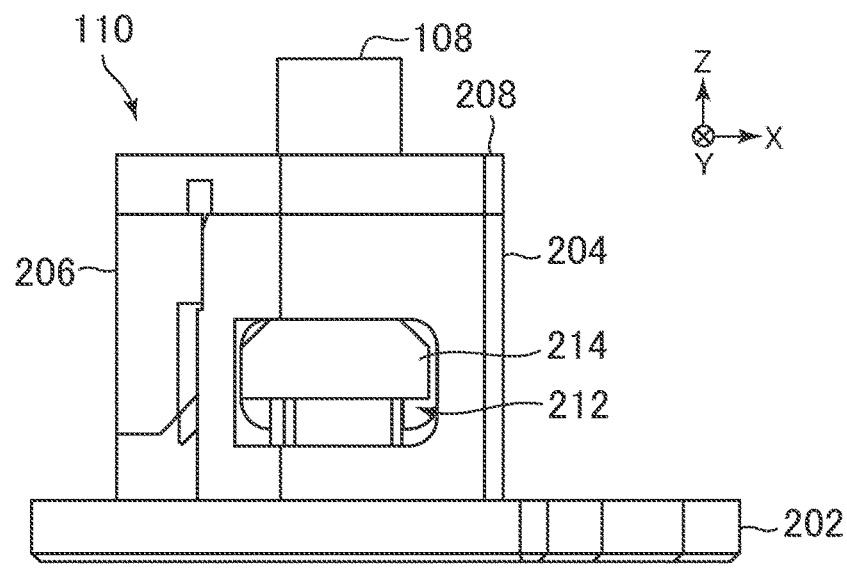
FIG. 3A is a side view of the measuring jig according to the at least one embodiment of the present disclosure.
Figure 3B:
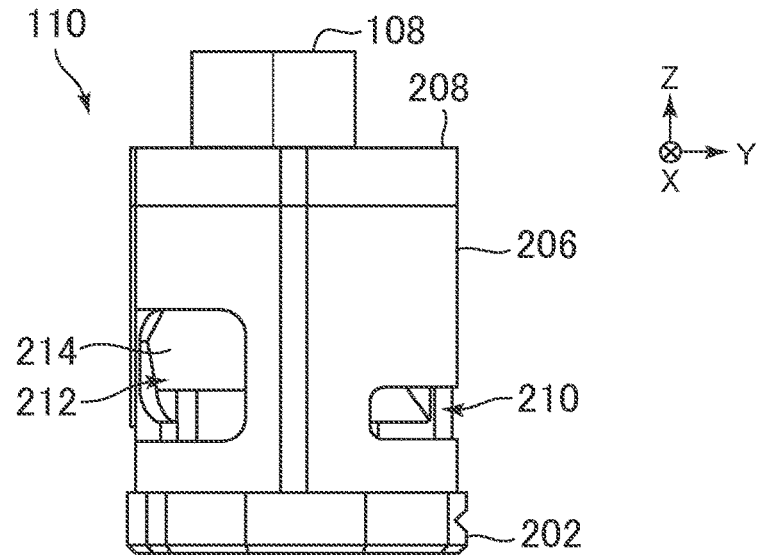
FIG. 3B is a side view of the measuring jig according to the at least one embodiment of the present disclosure.
Figure 3C:
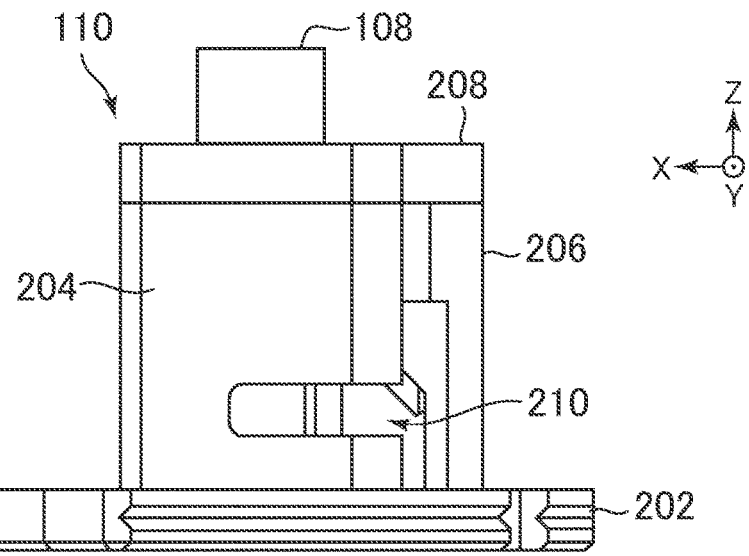
FIG. 3C is a side view of the measuring jig according to the at least one embodiment of the present disclosure.

The sample holder includes a frame body and an optical element 214. The sample holder, which is a member for holding the sample, is a jig used for light scattering measurement, and hence is hereinafter also referred to as "measuring jig 110." Specifically, description is given with reference to, for example, FIG. 2A to FIG. 3C. FIG. 2A and FIG. 2B are perspective views of the measuring jig 110 according to the at least one embodiment of the present disclosure as viewed from different directions. FIG. 3A to FIG. 3C are side views of the measuring jig 110 according to the at least one embodiment of the present disclosure. Further, the measuring jig 110 may be formed of only the frame body excluding the optical element 214, or may include the frame body, the optical element 214, and the cell 108.

Specifically, for example, the frame body includes a bottom surface portion 202, a first side surface portion 204, a second side surface portion 206, and an upper surface portion 208, and has a holding space. The bottom surface portion 202 is a plate-like member that is parallel to an XY plane. The first side surface portion 204 and the second side surface portion 206 are members erected on a surface on a Z-axis side of the bottom surface portion 202. A space corresponding to a shape of the cell 108 is formed between the first side surface portion 204 and the second side surface portion 206. The upper surface portion 208 is arranged on the Z-axis side of the first side surface portion 204 and the second side surface portion 206, and has an opening corresponding to the shape of the cell 108. The space between the first side surface portion 204 and the second side surface portion 206, and the opening form the holding space. The holding space is a space surrounded by the frame body, and is a space in which the cell 108 is to be arranged. The cell 108 arranged in the holding space is supported in an X-axis direction and a Y-axis direction by the frame body. Further, the cell 108 is supported in the Z-axis direction by the bottom surface portion 202.

Further, the frame body has a first opening 210 and a second opening 212. Specifically, the first opening 210 is an opening formed by a notched portion that is formed in the first side surface portion 204, and an end portion of the second side surface portion 206. The first opening 210 is formed in an incident portion of the first optical path, which is to be described later. The second opening 212 is a hole that penetrates from an outer side surface of the first side surface portion 204 to the holding space. The second opening 212 is formed in an incident portion of the second optical path, and in an exit portion of the first optical path and the second optical path. As illustrated, the second opening 212 has a larger diameter in the Z-axis direction as compared to the first opening 210.

The optical element 214 has a first surface 602 that forms a certain angle with a side surface of the cavity. Further, the optical element 214 has a portion having a triangular prism shape including the first surface 602 and a second surface 604, which is opposed in parallel to the cell 108 on a side opposite to the first surface 602. The optical element 214 is arranged in at least one of the incident portion or the exit portion of at least one optical path of the first optical path or the second optical path. In other words, it is only required that the optical element 214 be arranged in at least one of the incident portion of the first optical path, the exit portion of the first optical path, the incident portion of the second optical path, or the exit portion of the second optical path. For example, in the example illustrated in FIG. 2A to FIG. 3C, the optical element 214 is arranged in the incident portion of the second optical path and the exit portion of the second optical path. The optical element 214 may have another shape as long as the optical element 214 includes a portion having a triangular prism shape.

The light receiver 114 is arranged at a position at which the scattered light that is output from the sample is received, and measures an intensity of the scattered light. Specifically, the light receiver 114 is a measuring instrument that measures the intensity of the scattered light at predetermined time intervals, and acquires a change with time of the intensity of the scattered light. The light receiver 114 is arranged in exit portions of the forward measurement optical path, the side measurement optical path, and the back measurement optical path. The light sources, the mirrors 106, the half mirror 104, and the measuring jig 110 are arranged so that the exit portions of the forward measurement optical path, the side measurement optical path, and the back measurement optical path have the same optical path. In other words, the light receiver 114 is shared among the forward measurement, the side measurement, and the back measurement. Accordingly, a single light receiver 114 is provided in the light scattering measuring apparatus. As a result, the light scattering measuring apparatus 100 can be downsized.

The moving mechanism 112 moves the measuring jig 110 in a vertical direction. Specifically, when the at least one measurement of the forward measurement or the side measurement is to be performed, the moving mechanism 112 moves the first opening 210 to a position of the incident portion of the first optical path. Further, when the back measurement is to be performed, the moving mechanism 112 moves the second opening 212 to a position of the incident portion of the second optical path.

With the moving mechanism 112 moving the measuring jig 110 in the vertical direction, a switch can be made between the measurement (one or both of forward scattering measurement and side scattering measurement) using the first optical path, and the measurement (back scattering measurement) using the second optical path without moving the light sources 102, the mirrors 106, the half mirror 104, or other such components. When the cell 108 is inclined to perform the back scattering measurement as in the related art, it is required to perform the measurement using the first optical path and the measurement using the second optical path in different XY planes. However, with the measuring jig 110 being moved in the vertical direction, the measurement using the first optical path and the measurement using the second optical path can be performed in the same XY plane. Thus, it is not required to move the light sources 102, the mirrors 106, the half mirror 104, or other such components. Further, in the case in which the cell 108 is inclined, it is required to strictly control an inclination angle for adjustment of the optical path lengths, but in the case in which the measuring jig 110 is moved in the vertical direction, measurement accuracy is not affected even when some error occurs in a movement distance. Consequently, the measurement accuracy can be increased.

The light scattering measuring apparatus 100 conducts analysis by an information processing unit (not shown) based on the intensity of the scattered light measured by the light receiver 114. Specifically, the light scattering measuring apparatus 100 calculates a zeta potential, a particle diffusion coefficient, particle sizes, a particle size distribution, and the like based on the intensity of the scattered light through use of a photon correlation method. The information processing unit is a personal computer included in the light scattering measuring apparatus 100 or an external personal computer for use with the light scattering measuring apparatus 100, and performs computation required to calculate the zeta potential, the particle diffusion coefficient, the particle sizes, the particle size distribution, and the like.

Figure 4:
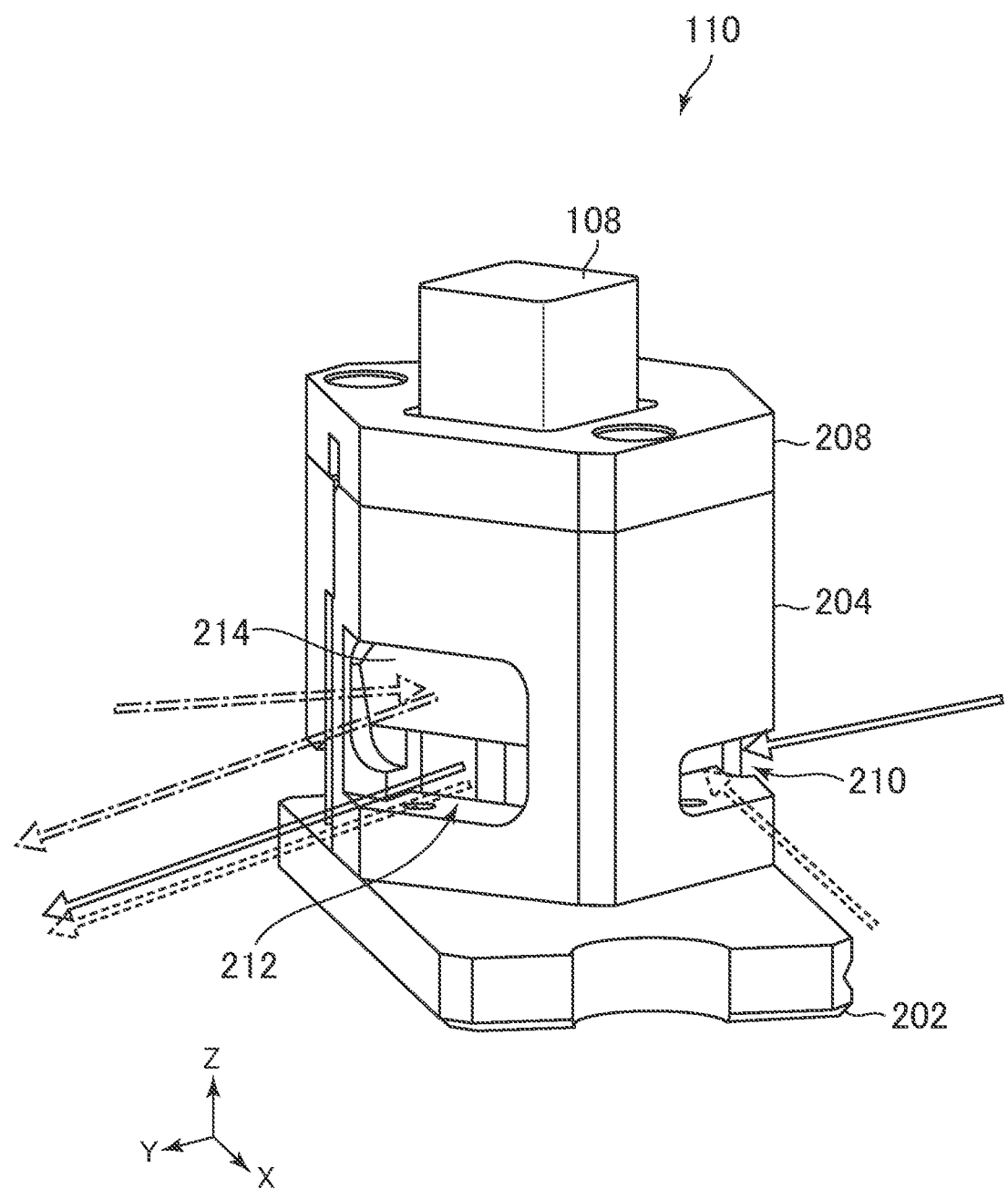
FIG. 4 is a perspective view of the measuring jig showing a forward measurement optical path, a side measurement optical path, and a back measurement optical path.
Figure 5A:
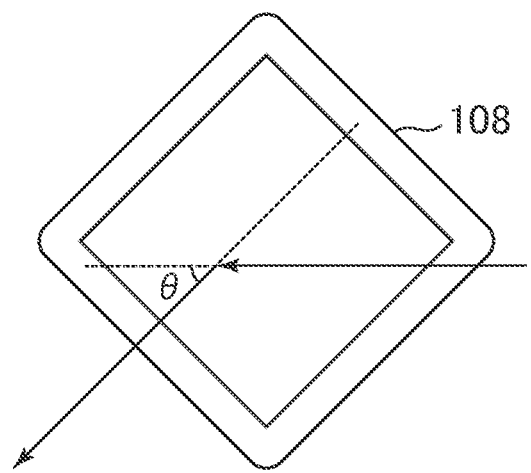
FIG. 5A is a view for illustrating the forward measurement optical path in a sample as viewed from a Z-axis direction.
Figure 5B:
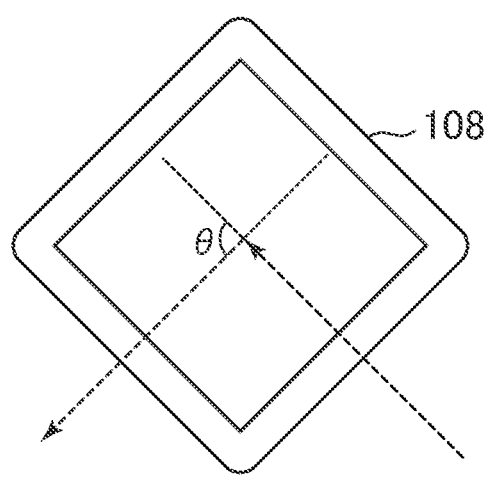
FIG. 5B is a view for illustrating the side measurement optical path in the sample as viewed from the Z-axis direction.
Figure 5C:
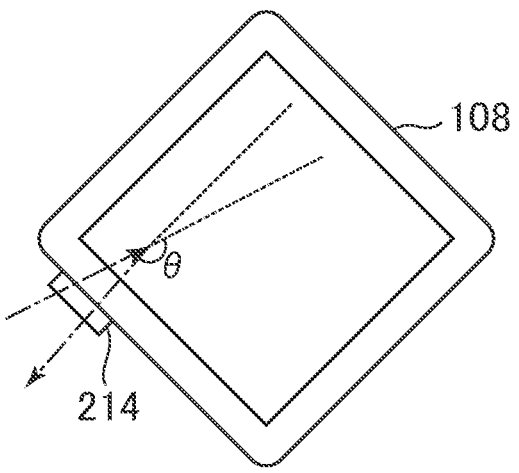
FIG. 5C is a view for illustrating the back measurement optical path in the sample as viewed from the Z-axis direction.
Figure 6:
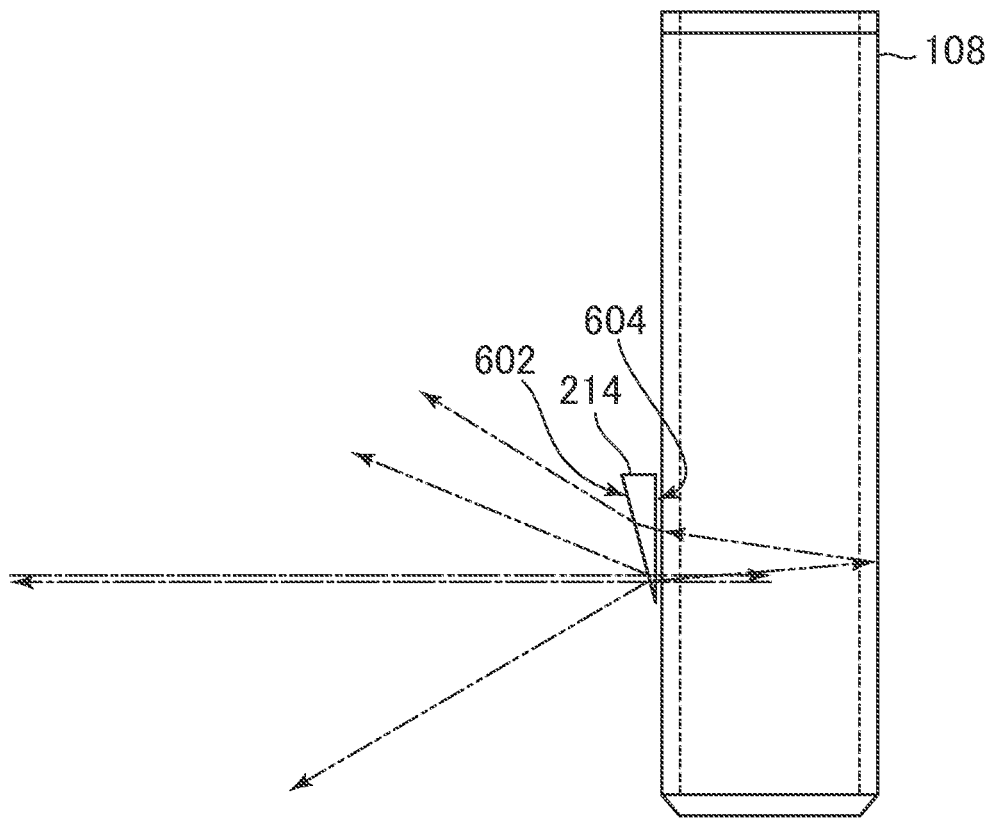
FIG. 6 is a view of the back measurement optical path as viewed from a side surface.

Next, the forward measurement optical path, the side measurement optical path, and the back measurement optical path are described with reference to FIG. 1 and FIG. 4 to FIG. 6. FIG. 4 is a perspective view of the measuring jig 110 showing the forward measurement optical path, the side measurement optical path, and the back measurement optical path. FIG. 5A to FIG. 5C are views for illustrating the cell 108, and the forward measurement optical path, the side measurement optical path, and the back measurement optical path in the sample arranged in the cavity of the cell 108 as viewed from the Z-axis direction. FIG. 6 is a view of the back measurement optical path of FIG. 5C as viewed from a side surface. Each solid line illustrated in FIG. 1 and FIG. 4 to FIG. 6 is the forward measurement optical path. Each chain line is the side measurement optical path. Each one dot chain line is the back measurement optical path.

As illustrated in FIG. 1, the forward measurement optical path is a path of light that starts at the first light source 102A, is transmitted through the half mirror 104, is reflected by a mirror 106A, is scattered by the sample, and reaches the light receiver 114. The side measurement optical path is a path of light that starts at the first light source 102A, is reflected by the half mirror 104 and a mirror 106B, is scattered by the sample, and reaches the light receiver 114. The back measurement optical path is a path of light that starts at the second light source 102B, is reflected by a mirror 106C and a mirror 106D, is scattered by the sample, and reaches the light receiver 114. A portion of each optical path until the light enters the sample is referred to as "incident portion," and a portion after the light is output from the sample is referred to as "exit portion."

As illustrated in FIG. 4, the light on the forward measurement optical path and the side measurement optical path passes through the first opening 210 and irradiates the sample. The light on the back measurement optical path passes through the second opening 212 and irradiates the sample. Further, output light on the forward measurement optical path, the side measurement optical path, and the back measurement optical path passes through the second opening 212 and enters the light receiver 114. Still further, the first optical path and the second optical path are separated from each other in the vertical direction. Specifically, the back measurement optical path is located on the side of the Z-axis direction of the forward measurement optical path and the side measurement optical path.

As illustrated in FIG. 5A, the light on the forward measurement optical path is scattered by the sample. Of the scattered light on the forward measurement optical path, light having a scattering angle θ of 20° passes through the second opening 212 and enters the light receiver 114.

As illustrated in FIG. 5B, the light on the side measurement optical path is scattered by the sample. Of the scattered light on the side measurement optical path, light having the scattering angle θ of 90° passes through the second opening 212 and enters the light receiver 114.

As illustrated in FIG. 5C, the light on the back measurement optical path is scattered by the sample. Of the scattered light on the back measurement optical path, light having the scattering angle θ of 160° passes through the second opening 212 and enters the light receiver 114. Further, as illustrated in FIG. 5C and FIG. 6, in the exit portion of the back measurement optical path, the optical element 214 is arranged. In the at least one embodiment of the present disclosure, the optical element 214 has a triangular prism shape arranged so as to have a triangular shape as viewed from the side surface. A surface that is opposed to the cell 108 and is parallel to a Z-axis is the second surface 604. A surface on the side opposite to the second surface 604, which forms a certain angle with a side surface of the cell 108, is the first surface 602. The optical element 214 prevents stray light, for example, light reflected on a surface of the cell 108, from entering the light receiver 114.

The arrows depicted with the one dot chain lines of FIG. 6 indicate directions of travel of light in the incident portion of the back measurement optical path, and the light entering the light receiver 114 of the scattered light. The arrows depicted with the two dot chain lines indicate directions of travel of the stray light. In this specification, the stray light is a component that does not contribute to the measurement, of the light entering the light receiver 114. Refractive indices of air, the optical element 214, the cell 108, and the sample are different, and hence intensities of light reflected on interfaces of the air, the optical element 214, the cell 108, and the sample are high. Accordingly, a main element of the stray light is the light reflected on surfaces of the optical element 214 and the cell 108.

Specifically, as illustrated in FIG. 6, the first surface 602 of the optical element 214 and the side surface of the cell 108 have the certain angle. Thus, the stray light reflected on the first surface 602 of the optical element 214 travels in a direction different from the direction in which the light receiver 114 exists. Similarly, the stray light transmitted through the optical element 214 and reflected on a surface (including the surface opposed to the optical element 214 and a surface on a side opposite to the surface) of the cell 108 travels in a direction different from the direction in which the light receiver 114 exists due to the difference in refractive index of the optical element 214 and the air. Consequently, an intensity of the stray light that enters the light receiver 114 is reduced by the optical element 214 so that the measurement accuracy can be increased.

With the light being refracted on the interface between the air and the cell 108, and the interface between the cell 108 and the sample, the direction of travel of the light is changed. Thus, in FIG. 5A to FIG. 5C, specifically, the direction of travel is changed at the interface between the air and the cell 108, and the interface between the cell 108 and the sample, but depiction of the change is omitted. Further, the optical element 214 may be arranged to be in contact with the cell 108, or may be arranged via an interval with the cell 108.

Next, a method of light scattering measurement using the light scattering measuring apparatus 100 is described with reference to a flow chart of FIG. 7. First, determination is made as to whether to perform multiangle measurement (Step S702). Specifically, with a user operating the light scattering measuring apparatus 100, the light scattering measuring apparatus 100 receives information indicating whether to perform the multiangle measurement. When it is determined that the multiangle measurement is to be performed, the process proceeds to Step S704.

Next, the measuring jig 110 is placed (Step S704). Specifically, the measuring jig 110, which is formed of the frame body and the optical element 214, is placed in the light scattering measuring apparatus 100. Then, the cell 108 is placed in the holding space of the measuring jig 110 (Step S706). In the cavity of the cell 108, the sample serving as the object to be measured is placed in advance. There is no particular order for Step S704 and Step S706, and after the cell 108 is first placed in the holding space of the measuring jig 110, the measuring jig 110 may be placed in the light scattering measuring apparatus 100.

Next, the moving mechanism 112 moves the measuring jig 110 so that the second opening 212 is positioned in the incident portion of the second optical path (Step S708). Specifically, the moving mechanism 112 adjusts the position in the Z-axis direction of the measuring jig 110 so that the back measurement optical path illustrated in FIG. 4 is positioned in the second opening 212.

Next, the light scattering measuring apparatus 100 performs the back scattering measurement (Step S710). Specifically, the second light source 102B emits light, and the light on the back measurement optical path passes through the optical element 214 and irradiates the sample. The light receiver 114 measures the intensity of the scattered light that has been scattered by the sample.

Next, the moving mechanism 112 moves the measuring jig 110 so that the first opening 210 is positioned in the incident portion of the first optical path (Step S712). Specifically, the moving mechanism 112 adjusts the position in the Z-axis direction of the measuring jig 110 so that the forward measurement optical path and the side measurement optical path illustrated in FIG. 4 are positioned in the first opening 210.

Next, the light scattering measuring apparatus 100 performs the forward scattering measurement and the side scattering measurement (Step S714). Specifically, the first light source 102A emits light, and the light on the forward measurement optical path irradiates the sample. The light receiver 114 measures the intensity of the scattered light that has been scattered by the sample. Similarly, the light scattering measuring apparatus 100 performs the side scattering measurement. Then, the light scattering measuring apparatus 100 calculates the particle size distribution with use of the intensities of the scattered light measured in Step S710 and Step S714, and the photon correlation method. The measurement performed in Step S714 may be only one of the forward scattering measurement and the side scattering measurement.

When it is determined in Step S702 that the multiangle measurement is not to be performed, the process proceeds to Step S716. In Step S716, the measuring jig 110 is placed. Then, the cell 108 is placed in the holding space of the measuring jig 110 (Step S718). Step S716 and Step S718 are similar to Step S704 and Step S706.

Next, the moving mechanism 112 moves the measuring jig 110 so that the first opening 210 is positioned in the incident portion of the first optical path or the second optical path (Step S720). Step S720 is similar to Step S712. Then, the light scattering measuring apparatus 100 performs the forward, side, or back scattering measurement (Step S722). For example, when the forward scattering measurement is performed in Step S722, the first light source 102A emits light, and the light on the forward measurement optical path irradiates the sample. The light receiver 114 measures the intensity of the scattered light that has been scattered by the sample. Then, the light scattering measuring apparatus 100 calculates the particle size distribution with use of the photon correlation method. The position to which the measuring jig 110 is moved in Step S720, and the measurement performed in Step S722 may be selected in accordance with an instruction from the user as appropriate.

Through the steps described above, measurement by the three methods of the forward scattering measurement, the side scattering measurement, and the back scattering measurement, or measurement by one method of only the forward scattering measurement is performed in accordance with the instruction from the user.

Figure 7:
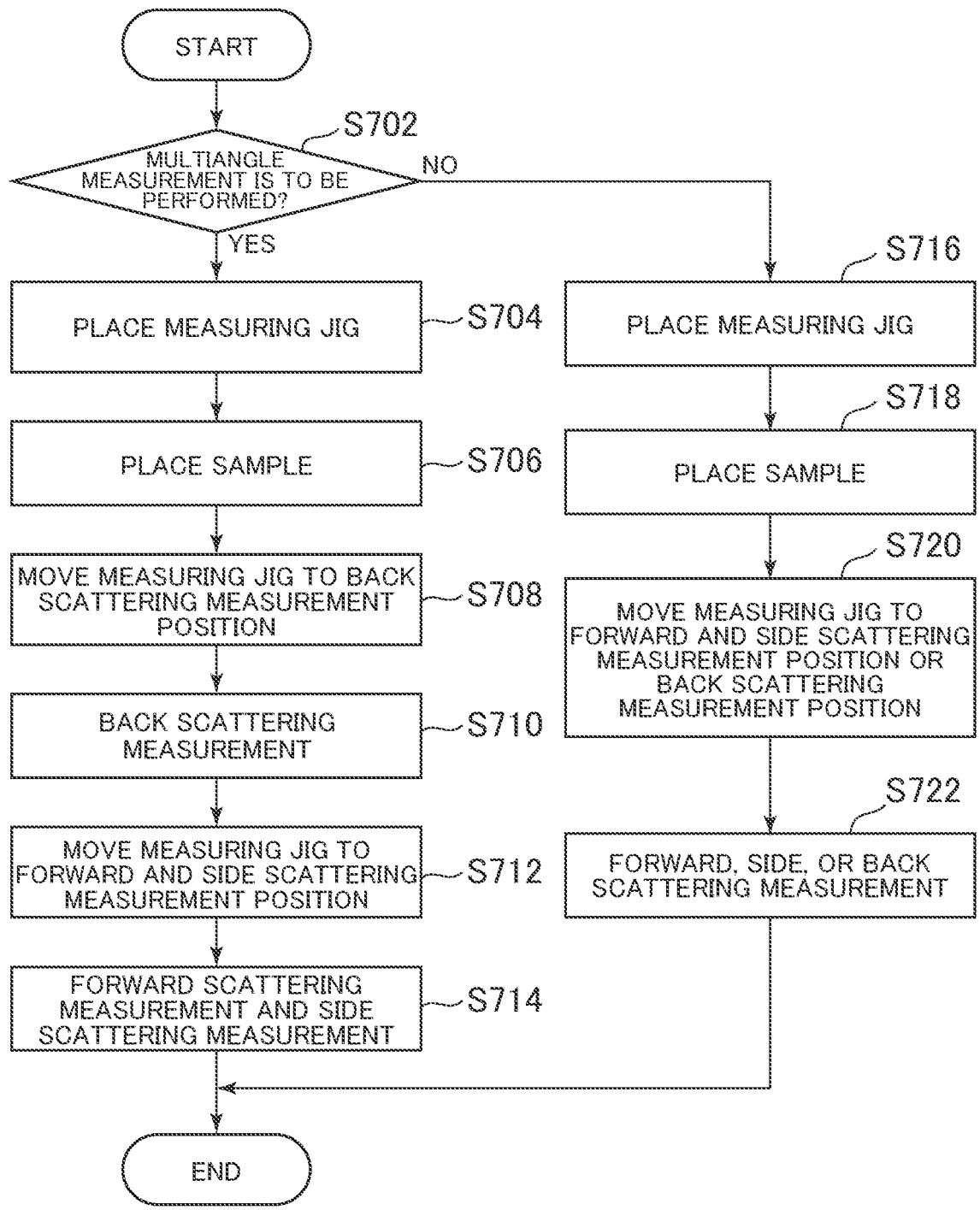
FIG. 7 is a flow chart for illustrating a method of light scattering measurement.
Figure 8A:
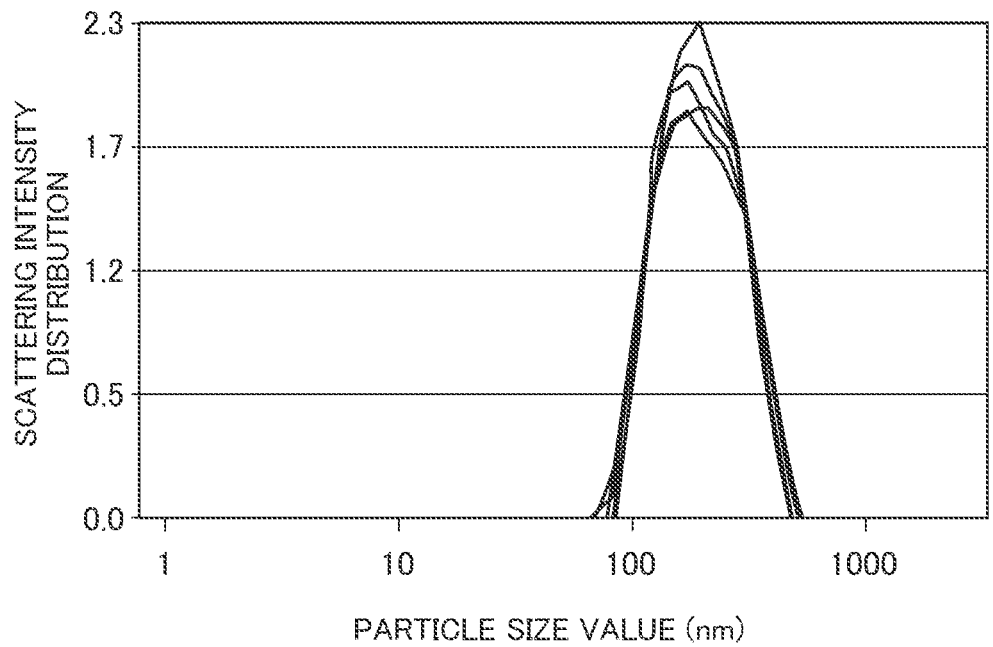
FIG. 8A shows an example of measurement results.
Figure 8B:
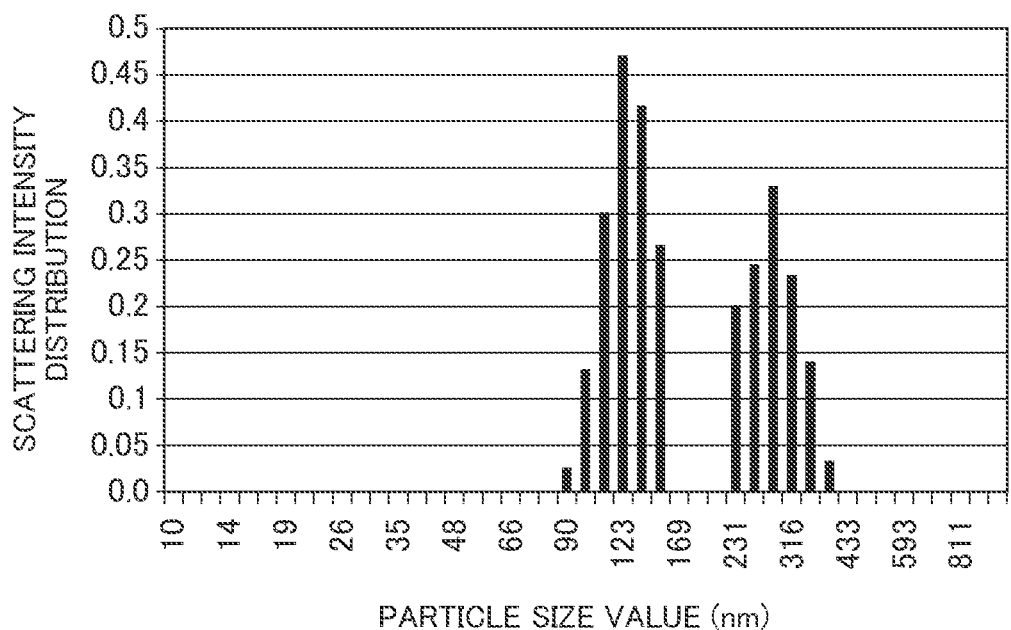
FIG. 8B shows an example of measurement results.

FIG. 8A shows an example of measurement results obtained through Step S716 to Step S722 of FIG. 7. FIG. 8B shows an example of measurement results obtained through Step S704 to Step S714 of FIG. 7. The measurement results of FIG. 8A and FIG. 8B are measurement results for the same sample.

As shown in FIG. 8A, in the analysis results obtained by one method of only the forward scattering measurement, a scattering intensity distribution with a peak at particle size values of from 200 nm to 300 nm is obtained. In contrast, as shown in FIG. 8B, in the analysis results obtained by the three methods of the forward scattering measurement, the side scattering measurement, and the back scattering measurement, a scattering intensity distribution with two peaks at particle size values of 120 nm and 280 nm is obtained. In other words, through the analysis by the three methods, for a sample in which particles with different particle sizes but with a small difference between the particle sizes are mixed, a distribution separated for each particle of a different particle size was successfully obtained. In contrast, when it is sufficient to obtain an approximate particle size distribution, the analysis by one method can be performed to reduce time required for the measurement.

The present invention is not limited to the modes described in the embodiments described above. For example, in the above description, the second opening 212 is positioned in the exit portion of the first optical path, and in the incident portion and the exit portion of the second optical path. However, the opening arranged in the exit portion of the first optical path, and the opening arranged in the incident portion and the exit portion of the second optical path may be different openings. For example, the opening arranged in the exit portion of the first optical path may be a third opening that is separated from the second opening 212 arranged in the incident portion and the exit portion of the second optical path.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A light scattering measuring apparatus, comprising:
light sources configured to generate incident light to irradiate a sample;
a single light receiver, which is arranged at a position at which scattered light output from the sample is received, and is configured to measure an intensity of the scattered light;
a sample holder including:
a cell having a cavity in which the sample is to be contained;
a frame body having a holding space in which the cell is to be arranged, a first opening formed in an incident portion of a first optical path used for at least one measurement of forward measurement or side measurement, in which a scattering angle formed by the incident light and the scattered light is 100° or less, and a second opening formed in an incident portion of a second optical path used for back measurement, in which a scattering angle exceeds 100°; and
an optical element having a first surface that forms a certain angle with a side surface of the cavity; and
a moving mechanism configured to move the sample holder in a vertical direction,
the optical element being arranged in at least one of the incident portion or an exit portion of at least one optical path of the first optical path or the second optical path,
the first optical path and the second optical path being separated from each other in the vertical direction,
the moving mechanism being configured to move the first opening to a position of the incident portion of the first optical path when the at least one measurement of forward measurement or side measurement is to be performed, and to move the second opening to a position of the incident portion of the second optical path when the back measurement is to be performed.

2. The light scattering measuring apparatus according to claim 1, wherein the second opening is formed in the exit portion of the first optical path and the second optical path.

3. The light scattering measuring apparatus according to claim 1, wherein the optical element has a portion having a triangular prism shape including the first surface and a second surface, which is opposed in parallel to the cell on a side opposite to the first surface.

4. The light scattering measuring apparatus according to claim 1,
wherein the scattering angle of the forward measurement exceeds 0° and is 80° or less,
wherein the scattering angle of the side measurement exceeds 80° and is 100° or less, and
wherein the scattering angle of the back measurement exceeds 100° and is less than 180°.

5. The light scattering measuring apparatus according to claim 1, wherein the light sources include a first light source configured to generate light on the first optical path, and a second light source configured to generate light on the second optical path.

6. A measuring jig, comprising:
a frame body configured to have a holding space to hold a cell, wherein the cell contains a sample to be measured,
the frame body comprising a first side surface and a second side surface, a top surface, and a bottom surface;
wherein the first side surface has a first opening formed in the first side surface and along an incident portion of a first optical path used for one measurement of forward measurement and one measurement of side measurement, in which a scattering angle formed by incident light to irradiate the sample and scattered light is 100° or less,
wherein the second side surface has a second opening formed in the second side surface and along an incident portion of a second optical path used for back measurement, in which a scattering angle exceeds 100°,
wherein the first optical path and the second optical path are separated from each other in a vertical direction;
wherein neither the top surface nor the bottom surface include an opening for an optical path;
wherein a forward measurement optical path for the forward measurement and a side measurement optical path for the side measurement are approximately 30° to 80° apart from one another.

7. The measuring jig according to claim 6, further comprising an optical element, which has a first surface that forms a certain angle with a side surface of the cavity, and is arranged on one of the cell and the frame body,
the optical element being arranged on at least one optical path of the first optical path or the second optical path, and in at least one of the incident portion or an exit portion.

8. The measuring jig according to claim 7, further comprising the cell.

9. The measuring jig according to claim 6, wherein the frame body holding space is configured to hold a cell which has a generally cubical shape.

10. The measurement jig according to claim 6, wherein the first opening and the second opening are approximately opposite to one another.

11. The measurement jig according to claim 6 wherein the first side surface and the second side surface are flat.

12. The measurement jig according to claim 6 wherein the first opening is the only opening on the first side surface and wherein the second opening is the only opening on the second side surface.

13. The measurement jig according to claim 6 wherein the second opening has a larger diameter than the first opening.

14. The measurement jig according to claim 6, wherein the top surface has an opening corresponding to the shape of the cell.

* * * * *